(No Model.)

J. S. BRIGGS.
NUT AND BOLT LOCK.

No. 496,379. Patented Apr. 25, 1893.

Witnesses

Inventor
John S. Briggs.
his Attorneys

UNITED STATES PATENT OFFICE.

JOHN S. BRIGGS, OF POLAND, MAINE.

NUT AND BOLT LOCK.

SPECIFICATION forming part of Letters Patent No. 496,379, dated April 25, 1893.

Application filed July 13, 1892. Renewed April 1, 1893. Serial No. 468,726. (No model.)

*To all whom it may concern:*

Be it known that I, JOHN S. BRIGGS, a citizen of the United States, residing at Poland, in the county of Androscoggin and State of Maine, have invented certain new and useful Improvements in Nut and Bolt Locks; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to nut and bolt locks, and has for its object to provide simple, inexpensive, and efficient locking mechanism that can be conveniently operated, and is adapted for use in connection with nuts and bolts of common construction, and especially with set screws.

My invention consists essentially in a sleeve which is rectangular or polygonal in its cross section, and which in operation confines a portion of the bolt and has on its inner end serrations which engage the plate or body which is to be secured in place; and in a spring which operates to keep the serrated end in contact with said plate or body.

My invention also consists in certain details of construction and operation all of which will be hereinafter fully and clearly described and specifically claimed.

Figure 1:
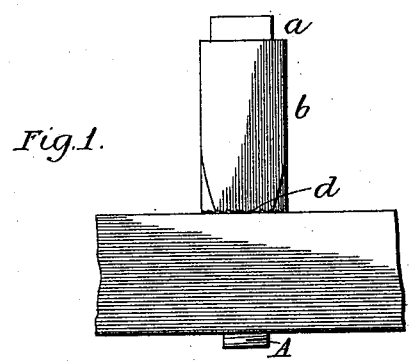
Figure 2:
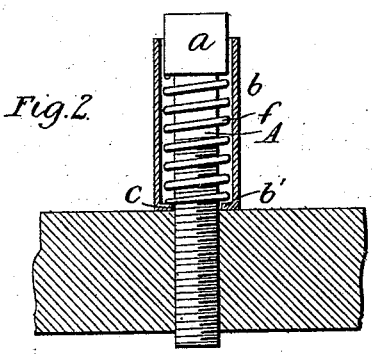
Figure 3:
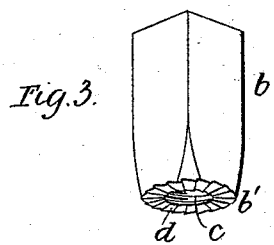

In the accompanying drawings which form a part of this specification, Figure 1 illustrates in elevation my improved locking mechanism; Fig. 2, a longitudinal central section; Fig. 3 a detail in perspective of the locking sleeve; and Fig. 4 a view of a serrated plate to which my device is applicable.

The letter A denotes the bolt which is provided with a rectangular or other shaped head $a$.

Figure 4:
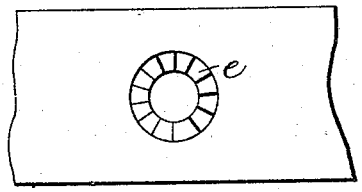

$b$ is the locking sleeve which entirely conforms to the shape of the head $a$, and through which the bolt is passed. The inner end $b'$ of this locking sleeve is partially closed, a circular opening $c$ being formed to receive the threaded shank of the bolt, and in this inner end is formed a series of serrations $d$ which in operation engage the plain surface of a plate or body, or as shown in Fig. 4, engage a series of serrations $e$ in said plate.

$f$ is a coiled spring which fits within the sleeve and is interposed between the end $b'$ and the head of the bolt as shown. The function of this spring is to keep the serrated end of the sleeve in contact with the plate or body to prevent the former from becoming accidentally disengaged.

In operation, the bolt is passed through the sleeve and is screwed into the hole made therefor in the plate. As the bolt is screwed down the head thereof enters the sleeve which turns therewith until sufficiently tight when it will be found that the serrations operate to prevent the unscrewing and loosening of the bolt. When the bolt head is entirely within the sleeve the wrench is applied to the sleeve which in this event turns the bolt.

My invention is especially applicable for use in connection with set screws for shafting and other mechanism but is adapted to be used with all classes of bolts and nuts.

I claim—

1. In a nut and bolt lock, the combination with a bolt having a rectangular or other head, of a sleeve interiorly conforming to said head, a spring interposed between the head and the inner end of the sleeve, and a series of serrations on said inner end for engagement with the serrated or plain plate or body.

2. In a nut and bolt lock, the combination of a plate or body having a series of serrations thereon, a headed bolt, a sleeve interiorly conforming to the head of the bolt a spring between the inner end of the sleeve and the bolt head, and a series of serrations on said inner end for engagement with the serrations in the plate.

In testimony whereof I affix my signature in presence of two witnesses.

JOHN S. BRIGGS.

Witnesses:
 NOEL B. POTTER,
 HENRY F. HARKELS.